US009216618B2

(12) United States Patent
Suga (10) Patent No.: US 9,216,618 B2
(45) Date of Patent: Dec. 22, 2015

(54) PNEUMATIC TIRE

(71) Applicant: The Yokohama Rubber Co., LTD., Minato-ku, Tokyo (JP)

(72) Inventor: Yuuichi Suga, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/386,746

(22) PCT Filed: Mar. 19, 2013

(86) PCT No.: PCT/JP2013/057899
§ 371 (c)(1),
(2) Date: Sep. 19, 2014

(87) PCT Pub. No.: WO2013/141261
PCT Pub. Date: Sep. 26, 2013

(65) Prior Publication Data
US 2015/0075686 A1 Mar. 19, 2015

(30) Foreign Application Priority Data

Mar. 21, 2012 (JP) ................................. 2012-064295
Jan. 31, 2013 (JP) ................................. 2013-017186

(51) Int. Cl.
*B60C 11/13* (2006.01)
*B60C 11/03* (2006.01)
(Continued)

(52) U.S. Cl.
CPC ............... *B60C 11/01* (2013.01); *B60C 11/033* (2013.04); *B60C 11/0304* (2013.04);
(Continued)

(58) Field of Classification Search
CPC ........ B60C 11/01; B60C 11/02; B60C 11/04; B60C 2011/0341; B60C 11/0304; B60C 11/033; B60C 11/1323; B60C 11/1392; B60C 2011/0353; B60C 2011/0365; B60C 2011/0367

USPC ................... 152/209.3, 209.8, 209.9, 209.18, 152/209.26, 209.27, 900, 901
See application file for complete search history.

(56) References Cited

U.S. PATENT DOCUMENTS

| 5,733,393 | A | * | 3/1998 | Hubbell et al. ............ 152/209.5 |
| 2008/0283169 | A1 | | 11/2008 | Sato et al. |
| 2010/0212792 | A1 | | 8/2010 | Mita |
| 2010/0212795 | A1 | | 8/2010 | Murata |

(Continued)

FOREIGN PATENT DOCUMENTS

| JP | 2008-307950 | 12/2008 |
| JP | 2009-090680 | 4/2009 |
| JP | 2009-143450 | 7/2009 |
| JP | 2010-058781 | 3/2010 |

(Continued)

OTHER PUBLICATIONS

International Search Report dated Jun. 25, 2013, 4 pages, Japan.

*Primary Examiner* — Eric Hug
(74) *Attorney, Agent, or Firm* — Thorpe North & Western (57) ABSTRACT

A pneumatic tire is mounted on a vehicle so a first side in a tire width direction corresponds to a vehicle outer side. A tread surface has four circumferential main grooves extending in a tire circumferential direction and five land portions partitioned by the circumferential main grooves. A ratio $W_2/W_1$ ranges 4 to 5 when $W_1$ is a groove width of a first circumferential main groove that is located at a first position when viewed from the first side and $W_2$ is defined as a groove width of a second circumferential main groove located at a second position when viewed from the first side, and a ratio $S_{in}/S_{out}$ ranges 1.1 to 1.2 when, in a region of the tread surface which interposes the tire centerline, $S_{out}$ is defined as a groove surface area ratio in a region on the first side and $S_{in}$ is defined as a groove surface area ratio in a region on the second side.

20 Claims, 3 Drawing Sheets

(51) Int. Cl.
*B60C 11/04* (2006.01)
*B60C 11/01* (2006.01)
*B60C 11/12* (2006.01)

(52) U.S. Cl.
CPC ............... *B60C 11/04* (2013.01); *B60C 11/12* (2013.01); *B60C 11/1323* (2013.04); *B60C 11/1392* (2013.04); *B60C 2011/0341* (2013.04); *B60C 2011/0353* (2013.04); *B60C 2011/0365* (2013.04); *B60C 2011/0367* (2013.04)

(56) References Cited

U.S. PATENT DOCUMENTS

2011/0061780 A1\*  3/2011  Mita ........................ 152/209.8
2012/0060987 A1\*  3/2012  Nemoto ................... 152/209.8

FOREIGN PATENT DOCUMENTS

JP    2010-215221    9/2010
JP    2011-230699    11/2011

\* cited by examiner

PNEUMATIC TIRE

TECHNICAL FIELD

The present technology relates to a pneumatic tire.

BACKGROUND

Recently, in conjunction with increasing performance of vehicles, there are strong demands that pneumatic tires perform both steering stability on a dry road surface and steering stability on a wet road surface to a high degree while running at a high speed.

Generally, as a method of improving steering stability on the wet road surface, drainage is ensured by disposing many inclined grooves and sipes on a tread surface of a tire. However, with this method, because a rigidity of a land portion formed on the tread surface decreases, there is a problem where it becomes difficult to ensure steering stability on the dry road surface.

With regard to such a problem, a pneumatic tire that performs both steering stability on the dry road surface and steering stability on the wet road surface to a high degree is known (Japanese Unexamined Patent Application Publication No. 2010-215221A).

This pneumatic tire has four main grooves extending in a straight shape in a tire circumferential direction in a ground region of a tread surface and has five land portions partitioned by the main grooves on the tread surface.

A groove width of the main groove positioned nearest to one side in a tire width direction from among these four main grooves is formed narrower than a groove width of any of the other three main grooves, and a ratio $W_{max}/W_{out}$ between a maximum groove width $W_{max}$ of the three main grooves and a groove width $W_{out}$ of the main groove positioned nearest to the one side in the tire width direction is set as 2.0 to 3.0.

Additionally, only the land portion positioned nearest to the one side in the tire width direction from among the five land portions is formed in a block column by being partitioned by inclined grooves disposed at predetermined intervals in the tire circumferential direction, and the other four land portions are formed as ribs that continue in the tire circumferential direction.

A ratio $S_{in}/S_{out}$ between a groove surface area ratio $S_{in}$ of another side in the tire width direction and a groove surface area ratio $S_{out}$ of the one side in the tire width direction with a tire equator in the ground contact region as a center is set as 1.25 to 1.35, and regarding the groove surface area ratios in the ground contact region of the three land portions which do not include the land portion nearest to the other side in the tire width direction and the land portion nearest to the one side in the tire width direction from among the five land portions, the groove surface area ratio of another side in the tire width direction is larger than the groove surface area ratio of one side in the tire width direction when a center line of each land portion is defined as a boundary.

While the known pneumatic tire described above can provide both steering stability on the dry road surface and steering stability on the wet road surface at the high dimension, situations are increasing where an additional improvement of uneven wear resistance of the pneumatic tire is still further demanded so the pneumatic tire can be used continuously for a longer period without a tire exchange or a tire rotation. With the known pneumatic tire described above, improvement of uneven wear resistance is not considered.

SUMMARY

The present technology provides a pneumatic tire that improves uneven wear resistance, as well as maintains one of steering stability on a dry road surface and steering stability on a wet road surface and at least improves the other one.

A pneumatic tire of one aspect of the present technology is a pneumatic tire that mounts on a vehicle where, when mounted on the vehicle, a first side in a tire width direction corresponds to a vehicle outer side and a second side that is an opposite side of the first side in the tire width direction corresponds to a vehicle inner side.

A region of a tread surface of the pneumatic tire includes
 four circumferential main grooves extending in a tire circumferential direction,
 five land portions partitioned by the circumferential main grooves,
 first shoulder inclined grooves that are formed in a region of a first side shoulder land portion, from among the land portions, positioned on an outermost side in the tire width direction on the first side and extend in the tire width direction,
 second side shoulder inclined grooves that are formed in a region of a second side shoulder land portion positioned on an outermost side in the tire width direction on the second side and extend in the tire width direction, and
 chamfers formed on an entire periphery of an edge where the first side shoulder land portion contacts the first side shoulder inclined grooves and an entire periphery of an edge where the second side shoulder land portion contacts the second side shoulder inclined grooves.

A ratio $W_2/W_1$ that represents a ratio of a groove width $W_2$ of a second circumferential main groove located at a second position when viewed from the first side to a groove width $W_1$ of a first circumferential main groove located at a first position when viewed from the first side from among the four circumferential main grooves ranges 4 to 5 when $W_2$ is in a range of 16 to 20 mm.

Additionally, a ratio $S_{in}/S_{out}$ that represents a ratio of a groove surface area ratio $S_{in}$ in a region located on the second side when viewed from a tire centerline to a groove surface area ratio $S_{out}$ in a region located on the first side when viewed from the tire centerline in the region of the tread surface ranges 1.1 to 1.2 when $S_{in}$ is in a range of 35.2 to 38.4%.

The pneumatic tire of the above aspect can improve uneven wear resistance, as well as maintains one of steering stability on a dry road surface and steering stability on a wet road surface and at least improves the other one.

DETAILED DESCRIPTION

A pneumatic tire of the present embodiment will be described. The pneumatic tire of the embodiment that will be described below applies to, for example, a passenger car tire established in Chapter A in JATMA YEAR BOOK 2011 but can also be applied to a small truck tire established in Chapter B or a bus and truck tire established in Chapter C. The pneumatic tire of the present embodiment that will be described below is a passenger car tire.

Note that in the description below, a tire width direction is a direction parallel to a rotational axis of the pneumatic tire. A tire width direction outward side is a direction moving away from a tire centerline CL in the tire width direction. Additionally, a tire width direction inward side is a direction moving nearer to the tire centerline CL in the tire width direction. A tire circumferential direction is a direction that rotates with a rotational axis of the pneumatic tire as a center of rotation. A tire radial direction is a direction orthogonal to the rotational axis of the pneumatic tire. A tire radial direction outward side refers to a direction moving away from the rotational axis. Additionally, a tire radial direction inward side refers to a direction moving nearer to the rotational axis.

A tire ground contact width that will be described below refers to a maximum linear distance in the tire width direction in a contact patch formed on a plate when an air pressure corresponding to a maximum load capacity of the Japan Automobile Tyre Manufacturers Association (JATMA) is filled in a tire, the tire is placed vertically on the plate in a stationary state, and a load corresponding to 80% of the maximum load capacity is loaded. A groove surface area ratio that will be described below refers to a ratio of a surface area of a groove opening portion that opens to a ground contact region to a surface area of a predetermined region of the ground contact region within the ground contact width described above in the tire width direction.

Tire Structure

Figure 1:
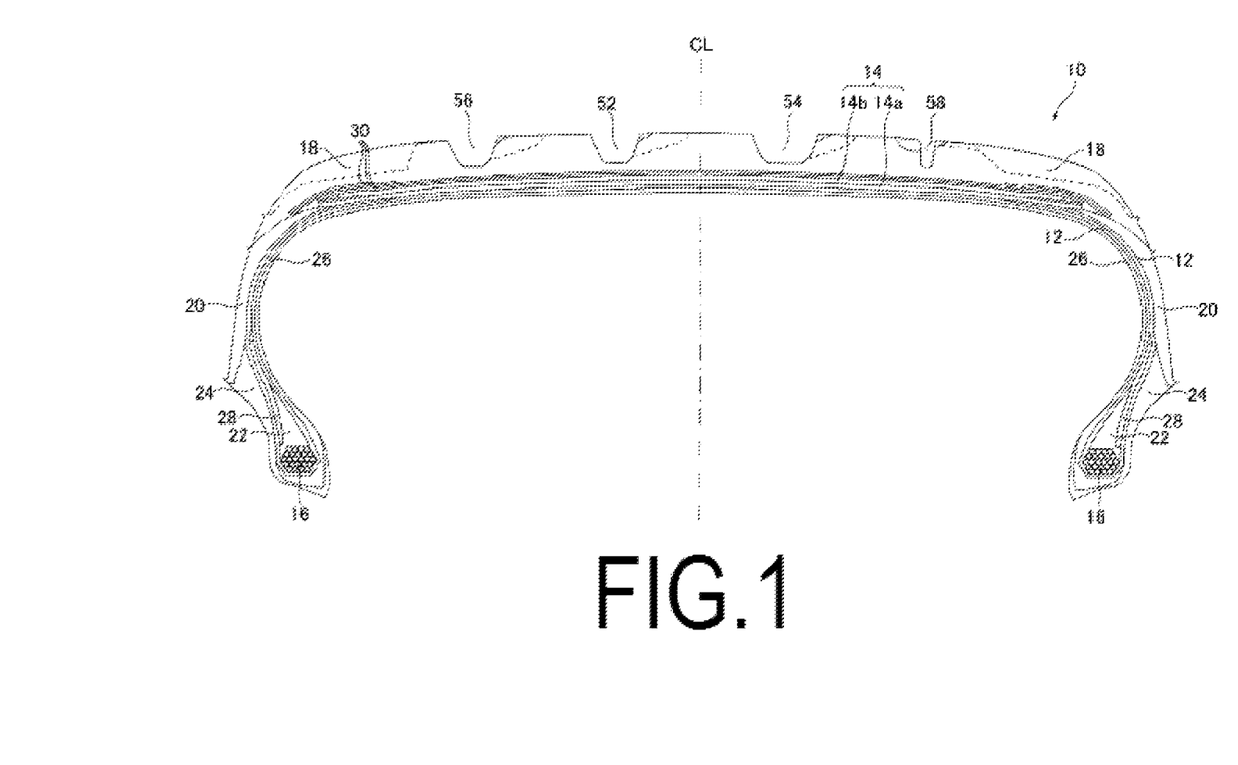
FIG. 1 is a tire profile cross-sectional view illustrating a cross section of a pneumatic tire of the present embodiment.

FIG. 1 is a profile cross-sectional view of a tire 10 of the present embodiment. The tire 10 mainly includes, as skeletal material, a carcass ply layer 12, a belt layer 14, and a bead core 16, with a tread rubber member 18, a side rubber member 20, a bead filler rubber member 22, a rim cushion rubber member 24, and an inner liner rubber member 26 around these skeletal materials.

The carcass ply layer 12 is constituted by a carcass ply material that is wound between a pair of bead cores 16 of annular shapes, forms a toroidal shape, and has organic fibers covered with rubber. The carcass ply material is wound around the bead cores 16 and the wound carcass ply extends to a tire radial direction inward side of a shoulder region of the tread rubber member 18. The belt layer 14 constituted by two belt members 14a, 14b is provided on a tire radial direction outward side of the carcass ply layer 12. The belt layer 14 is a member where rubber coves steel cords arranged inclined at a predetermined angle, for example, 20 to 30 degrees, relative to the tire circumferential direction, and a width in the tire width direction of the belt members 14a that is a lower layer is longer than that of the belt member 14b that is the upper layer. The inclination directions of the steel cords of the two layers of the belt members 14a, 14b are in the opposite direction to each other. Therefore the belt members 14a, 14b are crossing layers, and they reduce the expansion of the carcass ply layer 12 due to the inflation air pressure.

The tread rubber member 18 is provided on a tire radial direction outward side of the belt layer 14, and the side wall rubber member 20 is connected to both ends of the tread rubber member 18 to form a side portion. The rim cushion rubber member 24 is provided on an end on a tire radial direction inward side of the side wall rubber member 20 and contacts a rim on which the tire 10 is mounted. The bead filler rubber member 22 is provided on a tire radial direction outward side of the bead cores 16 so as to be interposed between a portion of the carcass ply layer 12 before being wound around the bead cores 16 and a wound portion of the carcass ply layer 12 wound up around the bead cores 16. The inner liner rubber member 26 is provided on the inner surface of the tire 10 facing the tire cavity region that is filled with air that is enclosed by the tire 10 and the rim.

Additionally, the tire 10 is provided with a bead stiffener 28 between the carcass layer 12 wound around the bead cores 16 and the bead filler rubber member 22 and is further provided with three layers of a belt cover layer 30 that covers the belt layer 14 from the tire radial direction outward side of the belt layer 14 and has organic fibers covered with rubber.

The tire 10 has this tire structure, but the structure of the pneumatic tire according to the present technology is not limited to the tire structure illustrated in FIG. 1.

Tread Pattern

Figure 2:
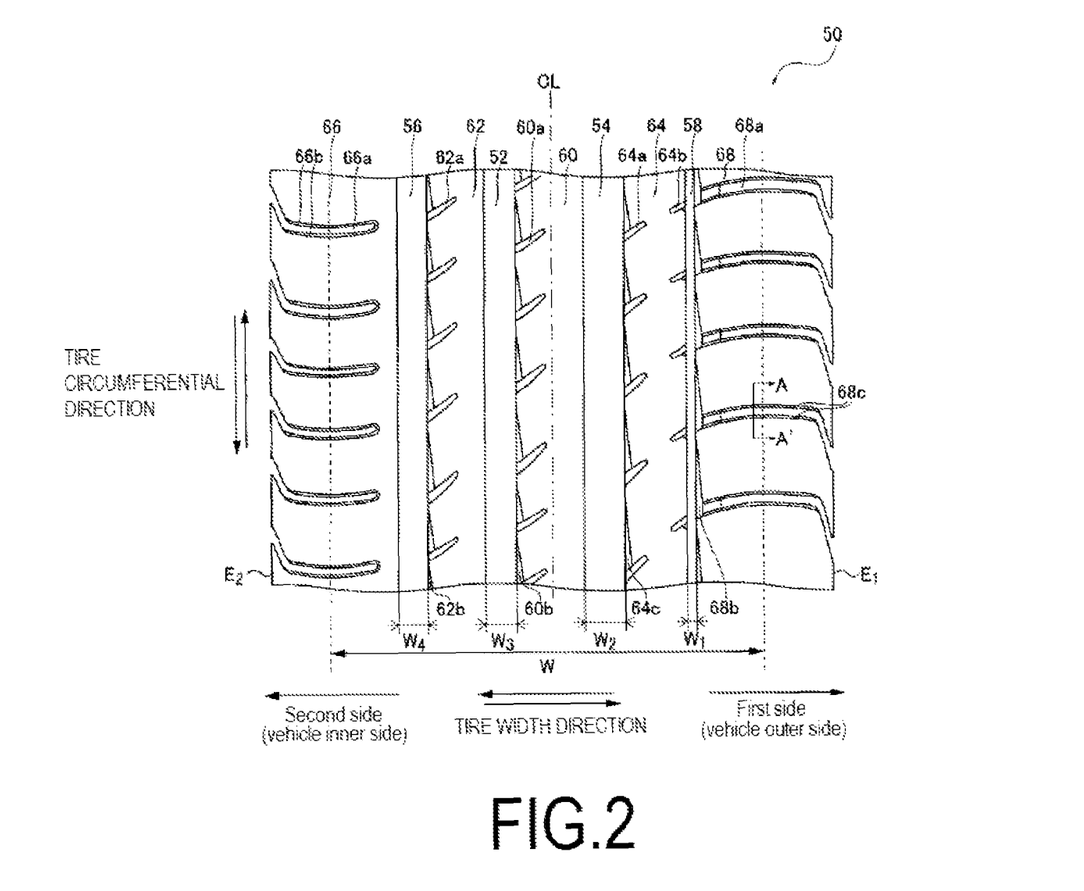
FIG. 2 is a planar exploded view illustrating an example of a tread pattern of the pneumatic tire illustrated in FIG. 1.

A tread pattern 50 is formed in a region on a tread surface of the tire 10. FIG. 2 is a pattern exploded view of an example of a portion on a tire periphery of the tread pattern 50 formed in the region on the tread surface of the tire 10 illustrated in FIG. 1 exploded on a plane.

The tread pattern 50 has four circumferential main grooves 52, 54, 56, 58 and five land portions 60, 62, 64, 66, 68 partitioned by the circumferential main grooves 52, 54, 56, 58. The circumferential main grooves 58, 54, 52, 56 are respectively a first, a second, a third, and a fourth circumferential main groove when viewed from a first side. The tire centerline CL passes through a region of the land portion 60. The land portions 64, 68 are provided on a first side (vehicle outer side) from among the first side and a second side of the tread surface between which the tire centerline CL is interposed, and the land portions 62, 66 are provided on the second side (vehicle inner side). The land portions 68, 64, 60, 62, 66 are, in order, a first, a second, a third, a fourth, and a fifth land portion when viewed from the first side. Hereinbelow, when viewed from the first side, the circumferential main groove 58 that comes first will be referred to as a first circumferential main groove 58, the circumferential main groove 54 that comes second will be referred to as a second circumferential main groove 54, the circumferential main groove 52 that comes third will be referred to as a third circumferential main groove 52, and the circumferential main groove 56 that comes fourth will be referred to as the a fourth circumferential main groove 56. Additionally, when viewed from the first side, the land portion 68 that comes first will be referred to as a first land portion (first side shoulder land portion) 68, the land portion 64 that comes second will be referred to as a second land portion (intermediate land portion) 64, the land portion 60 that comes third will be referred to as a third land portion 60, the land portion 62 that comes fourth will be referred to as a fourth land portion (intermediate land portion) 62, and the land portion 66 that comes fifth will be referred to as a fifth land portion (second side shoulder land portion) 66.

The second circumferential main groove 54 and the third circumferential main groove 52 are formed so groove centers of the second circumferential main groove 54 and the third circumferential main groove 52 are positioned in a range of 10 to 13% of the tire ground contact width away from the tire centerline CL on both sides in the tire width direction. The first circumferential main groove 58 and the fourth circumferential main groove 56 are formed so centers of the first circumferential main groove 58 and the fourth circumferential main groove 56 are positioned in a range of 20 to 35% of a tire ground contact width W away from the tire centerline CL.

The third land portion 60 is a portion that is formed by being interposed between the second circumferential main groove 54 and the third circumferential main groove 52 and contacts the ground. In a region of the third land portion 60, a plurality of inclined grooves (center inclined grooves) 60a that extend toward the first side from the third circumferential main groove 52 positioned on the second side are provided at predetermined intervals in the tire circumferential direction. Each of the inclined grooves 60a extends in a direction inclined relative to the tire width direction from the circumferential main groove 52, is not communicated to the second circumferential main groove 54, and is blocked midway in the region of the third land portion 60. An inclination angle of the inclined groove 60a relative to the tire width direction is, for example, 20 to 50 degrees. Therefore, the third land portion 60 forms a continuous land portion which extends continuously so as to go completely around in the tire circumferential direction.

Additionally, as illustrated in FIG. 2, the tire centerline CL passes between the second circumferential main groove 54 and the third circumferential main groove 52, but the inclined groove (center inclined groove) 60a provided in the region of the third land portion 60 that is the continuous land portion is preferably blocked midway without reaching the tire centerline CL. By the inclined groove 60a being blocked midway without reaching the tire centerline CL, an initial response during steering in steering stability on a dry road surface improves.

The fourth land portion 62 is a portion that contacts the ground and is formed by being interposed between the third circumferential main groove 52 and the fourth circumferential main groove 56. In a region of the fourth land portion 62, a plurality of inclined grooves 62a that extend toward the first side from the fourth circumferential main groove 56 positioned on the second side are provided at predetermined intervals in the tire circumferential direction. Each of the inclined grooves 62a extends in the direction inclined relative to the tire width direction (the same direction as the inclination direction of the inclined groove 60a) from the fourth circumferential main groove 56, is not communicated to the third circumferential main groove 52, and is blocked midway in the region of the fourth land portion 62. An inclination angle relative to the tire width direction of the inclined groove 62a is, for example, 20 to 50 degrees. Therefore, the fourth land portion 62 forms a continuous land portion which extends continuously so as to go completely around in the tire circumferential direction.

The second land portion 64 is a portion that is formed by being interposed between the first circumferential main groove 58 and the second circumferential main groove 54 and contacts the ground. In a region of the second land portion 64, a plurality of inclined grooves 64a that extend toward the first side in the direction inclined relative to the tire width direction (the same direction as the inclination direction of the inclined groove 60a) from the second circumferential main groove 54 positioned on the second side are provided at predetermined intervals in the tire circumferential direction. Each of the inclined grooves 64a is not communicated from the circumferential main groove 54 to the circumferential main groove 58 and is blocked midway in the region of the second land portion 64. Additionally, in the region of the second land portion 64, a plurality of inclined grooves 64b that extend toward the second side in the direction inclined relative to the tire width direction (the same direction as the inclination direction of the inclined groove 60a) from the first circumferential main groove 58 positioned on the first side are provided at predetermined intervals in the tire circumferential direction. The inclined groove 64b is not communicated from the first circumferential main groove 58 to the second circumferential main groove 54 and is blocked midway in the region of the second land portion 64. The inclination angles relative to the tire width direction of the inclined grooves 64a, 64b are, for example, 20 to 55 degrees. Therefore, the second land portion 64 forms a continuous land portion which extends continuously so as to go completely around in the tire circumferential direction. A blocked end of the inclined groove 64b in the region of the second land portion 64 is provided on an extension line that extends a blocked end of the inclined groove 64a in the region of the second land portion 64 in the inclination direction of the inclined groove 64a.

The fifth land portion (second side shoulder land portion) 66 is provided between the fourth circumferential main groove 56 and a pattern end $E_2$. In a region of the fifth land portion 66, a plurality of second side shoulder inclined grooves 66a are provided at predetermined intervals in the tire circumferential direction. Each of the second side shoulder inclined grooves 66a extends in the tire width direction from the pattern end $E_2$ toward the first side but does not connect (open) to the fourth circumferential main groove 56 and is blocked midway in the region of the fifth land portion 66. Therefore, the fifth land portion 66 forms a continuous land portion which extends continuously in the tire circumferential direction.

The first land portion (first side shoulder land portion) 68 is provided between the first circumferential main groove 58 and a pattern end $E_1$. In a region of the first land portion 68, a plurality of first side shoulder inclined grooves 68a are provided at predetermined intervals in the tire circumferential direction. Each of the first side shoulder inclined grooves 68a extends in the tire width direction from the pattern end $E_1$ toward the second side and connects and opens to the first circumferential main groove 58. Therefore, the first land portion 68 is partitioned in the tire circumferential direction by the first side shoulder inclined grooves 68a and forms a block column which is formed discontinuously in the tire circumferential direction.

When a groove width of the first circumferential main groove 58 is defined as $W_1$, a groove width of the second circumferential main groove 54 is defined as $W_2$, a groove width of the third circumferential main groove 52 is defined as $W_3$, and a groove width of the fourth circumferential main groove 56 is defined as $W_4$, the groove width $W_1$ is the smallest and the groove width $W_2$ is the largest from among the groove widths $W_1$ to $W_4$. At this time, a ratio $W_2/W_1$ that represents a ratio of the groove width $W_2$ to the groove width $W_1$ ranges 4 to 5. Additionally, when, from among the first side and the second side in the tire width direction that interpose the tire centerline CL in the tread pattern 50, a groove surface area ratio in a region on the first side is defined as $S_{out}$ and a groove surface area ratio in a region on the second side is defined as $S_{in}$, a ratio $S_{in}/S_{out}$ that represents a ratio of the groove surface area ratio $S_{in}$ to the groove surface area ratio $S_{out}$ ranges 1.1 to 1.2. At this time, the groove width $W_2$ is in a range of 16 to 20 mm. Additionally, the groove surface area ratio $S_{in}$ is in a range of 35.2 to 38.4%. At this time, the groove width $W_1$ is preferably in a range of 3.2 to 5 mm. Additionally, the groove surface area ratio $S_{out}$ is preferably in a range of 31 to 33%.

In this manner, by respectively establishing the ratio $W_2/W_1$ and the ratio $S_{in}/S_{out}$ of the tread pattern 50 in the ranges described above, as will be described below, uneven wear resistance can be improved, as well as either one of steering stability on the dry road surface or steering stability on a wet road surface can be maintained and the other one is at least improved. Compared to the conventional tire described above, in the present embodiment, uneven wear resistance improves by raising a value of the ratio $W_2/W_1$ and lowering a value of the ratio $S_{in}/S_{out}$. Here, uneven wear resistance refers to a difference, among regions of the first side and the second side in the tire width direction that interpose the tire centerline CL, between a wear amount of a tread rubber in the region on the first side and a wear amount of a tread rubber in the region on the second side being small. That is, uneven wear resistance can be improved by reducing, compared to the conventional example, an asymmetry of the tread patterns in the region on the first side and the region on the second side by increasing the groove width ratio $W_2/W_1$ between the second circumferential main groove 54 and the first circumferential main groove 58 positioned in a tread region of the first side from among the first side and the second side that interpose the tire centerline CL and also decreasing the ratio $S_{in}/S_{out}$.

Note that an average groove interval of the first side shoulder inclined grooves 68a that partition in the tire circumferential direction the first land portion 68 that is a shoulder land portion is preferably longer compared an average groove interval of the second side shoulder inclined grooves 66a that partition in the tire circumferential direction the fifth land portion 66 that is a shoulder land portion on the second side in order to provide steering stability of the tire 10 on both the dry road surface and the wet road surface. When a slip angle arises between the tire 10 and the ground and the tire 10 corners so a region on a first side in a region of the tread surface becomes an outer side of cornering, the region on the first side receives a high load due to load movement, and in particular, a ground contact pressure of the first land portion 68 increases, and the first land portion 68 also receives a large lateral force from the ground. A block rigidity of the first land portion 68 can be maintained high by making an average groove interval thereof longer compared to that of the fifth land portion 66 so the first land portion 68 can withstand this large lateral force. The land portion 66 does not receive a large lateral force compared to the first land portion 68 because the land portion 66 is mounted on the vehicle inner side on the vehicle. The average groove intervals of the inclined grooves refer to lengths where tire circumferences length at the first land portion 68 and the fifth land portion 66 are divided by a total number of the first side shoulder inclined grooves 68a and the second side shoulder inclined grooves 66a, respectively. The average groove interval of the first side shoulder inclined groove 68a is preferably 1.15 to 1.25 times the average groove interval of the second side shoulder inclined groove 66a.

Figure 3:
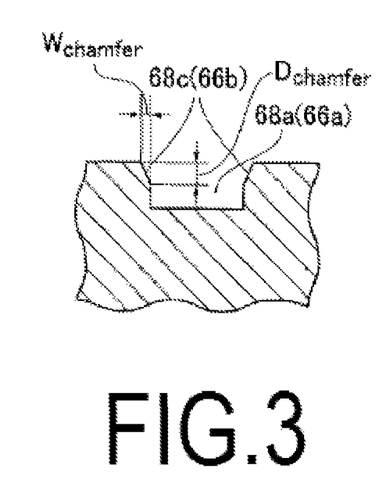
FIG. 3 is a diagram for describing chamfers illustrated in FIG. 2.

Additionally, as illustrated in FIG. 2, chamfers 66b, 68c are provided on entire peripheries of edges of the first land portion 68 and the fifth land portion 66 that contact the first side shoulder inclined groove 68a and the second side shoulder inclined groove 66a. In particular, the chamfer 66b is also provided on an edge of the fifth land portion 66 that contacts the second side shoulder inclined groove 66a. By the chamfers 66b, 68c, steering stability is performed on both the dry road surface and the wet road surface. FIG. 3 is a diagram illustrating an appearance of the chamfer 68c around the first side shoulder inclined groove 68a. By the chamfers 66b, 68c being provided, in the first land portion 66 and the fifth land portion 68 that are the shoulder land portions, the ground contact pressure is dispersed uniformly over an entirety of the first land portion 66 and the fifth land portion 68, and as a result, the lateral force approximately occurs uniformly in response to the ground contact pressure that approximates uniform also. Accordingly, steering stability of the tire 10 on the dry road surface and the wet road surface can be increased.

Chamfer surfaces of the chamfers 66b, 68c are, for example, flat surfaces or curved surfaces. In particular, when the chamfer surfaces of the chamfers 66b, 68c are flat surfaces, a depth $D_{chamfer}$ (see FIG. 3) and a width $W_{chamfer}$ (see FIG. 3) of the chamfers are preferably 0.5 to 2 mm in order to increase steering stability on the dry road surface.

A ratio $W_4/W_3$ of a groove width $W_3$ and a groove width $W_4$ is preferably 0.95 to 1.0 in order to provide steering stability on both the dry road surface and the wet road surface.

Ratios $D_1/D_2$ and $D_4/D_3$ are preferably less than 1, respectively, in order to provide steering stability on both the dry road surface and the wet road surface, where a ratio of $D_1$ to $D_2$ and a ratio of $D_4$ to $D_3$ are represented when a groove depth of the circumferential main groove 58 is defined as $D_1$, a groove depth of the circumferential main groove 54 is defined as $D_2$, a groove depth of the circumferential main groove 52 is defined as $D_3$, and a groove depth of the circumferential main groove 56 is defined as $D_4$. In particular, the ratio $D_1/D_2$ and the ratio $D_4/D_3$ are preferably 0.9 to 0.95. In a situation where the groove depths $D_1$, $D_4$ are shallow to an extent that the ratio $D_1/D_2$ and the ratio $D_4/D_3$ are less than 0.9, a wear life decreases, which is not preferable. Meanwhile, in a situation where the groove depths $D_2$, $D_3$ are deep to an extent that the ratio $D_1/D_2$ and the ratio $D_4/D_3$ exceed 0.95, the belt layer 14 (see FIG. 1) deforms into a wave shape due to these deep grooves and a high-speed durability is more likely to decrease, which is not preferable.

Additionally, concerning average groove intervals of inclined grooves 62a, 64a provided in the regions of the fourth land portion 62 and the second land portion 64, the second land portion 64 is preferably longer compared to the fourth land portion 62 in order to perform steering stability on both the dry road surface and the wet road surface. When the slip angle arises between the tire 10 and the ground and the tire 10 corners so the region on the first side of the tread region becomes the outer side of cornering, the region on the first side receives the high lateral force. Therefore, by making the average groove interval of the second land portion 64 longer compared to that of the fourth land portion 62 so the second land portion 64 can withstand the lateral force, a block rigidity of the second land portion 64 can be made high. For example, the average groove interval of the inclined grooves 64a provided in the region of the fourth land portion 64 is preferably 1.15 to 1.25 times the average groove interval of the inclined grooves 62a provided in the region of the fourth land portion 62.

Because opening ends of the inclined grooves 60a, 62a that extend in the regions of the third land portion 60 and the fourth land portion 62 are not present on edges on the first sides of the third land portion 60 and the fourth land portion 62, block rigidities of the third land portion 60 and the fourth land portion 62 can be prevented from decreasing. Accordingly, improving steering stability on the dry road surface is effective.

In the present embodiment, as illustrated in FIG. 2, on edges facing the second sides of the first land portion 68, the second land portion 64, the third land portion 60, and the fourth land portion 62, chamfers 60b, 62b, 64c, 68b whose chamfer widths change smoothly along the tire circumferential direction are provided between grooves adjacent each other in the tire circumferential direction. The chamfers 60b, 62b, 64c, 68b are provided so that widths of the chamfers are widest at portions at edges on the second side of the land portions 60, 62, 64, 68, respectively, where the inclined grooves and the circumferential main grooves form acute angles. Accordingly, when the slip angle arises between the tire 10 and the ground and cornering is performed so that the first side is positioned as the cornering outer side, edges on the first side of each land portion are most likely to be affected by the lateral force, but due to the chamfers 60b, 62b, 64c, 68b, the ground surface can be suppressed from float caused by the lateral force, and steering stability on the dry road surface can be improved. The groove widths $W_1$ to $W_4$ of the first circumferential main groove 58, the second circumferential main groove 54, the third circumferential main groove 52, and the fourth circumferential main groove 56 when the chamfers 60b, 62b, 64c, 68b are provided refer to groove widths when the chamfers 60b, 62b, 64c, 68c are not present. Note that in the present embodiment, the chamfers 60b, 62b, 64c, 68b do not need to be provided.

Additionally, in the present embodiment, the groove width $W_2$ is the largest from among the groove widths $W_1$ to $W_4$, but the groove width $W_2$, the groove width $W_3$, and the groove width $W_4$ may be the same, and the groove width $W_3$ or the groove width $W_4$ may be the largest.

WORKING EXAMPLES, CONVENTIONAL EXAMPLE, COMPARATIVE EXAMPLES

To confirm effects of the tire 10 of the present embodiment, tires are manufactured and mounted on a vehicle in order to perform a running test of steering stability on the dry road surface and the wet road surface and a wear test for evaluating uneven wear resistance. A tire size of the tire used is 245/40ZR18.

For a tire structure, tires of working examples 1 to 20, a conventional example, and comparative examples 1 to 5 employ the structure illustrated in FIG. 1, and for a tread pattern, the tires employ the pattern illustrated in FIG. 2 as a basic form.

The groove widths $W_1$ to $W_4$; the groove surface area ratios $S_{out}$, $S_{in}$; and the average groove intervals of the inclined grooves 62a, 64 are established as below. The groove width $W_2$ is changed variously in a range of 14 to 22 mm, and the groove surface area ratio $S_{in}$ is changed variously in a range of 32 to 41.6%. At this time, each tire is manufactured so the groove width $W_2$ and the groove surface area ratio $S_{in}$ of the working examples change in a range of 16 to 20 mm and a range of 35.2 to 38.4%, respectively.

TABLE 1

|  | Groove width $W_1$ | Groove width $W_2$ | Groove width $W_3$ | Groove width $W_4$ |
| --- | --- | --- | --- | --- |
| Conventional Example | 6 | 15 | 13.3 | 12 |
| Working Example 1 | 4 | 16 | 13.3 | 13 |
| Working Example 2 | 4 | 18 | 13.3 | 13 |
| Working Example 3 | 4 | 20 | 13.3 | 13 |
| Working Example 4 | 4 | 18 | 13.3 | 13 |
| Working Example 5 | 4 | 18 | 13.3 | 13 |
| Working Example 6 | 4 | 18 | 13.3 | 12.6 |
| Working Example 7 | 4 | 18 | 13.3 | 13.3 |
| Working Example 8 | 4 | 18 | 13.3 | 14 |
| Working Example 9 | 4 | 18 | 13.3 | 13 |
| Working Example 10 | 4 | 18 | 13.3 | 13 |
| Working Example 11 | 4 | 18 | 13.3 | 13 |
| Working Example 12 | 4 | 18 | 13.3 | 13 |
| Working Example 13 | 4 | 18 | 13.3 | 13 |
| Working Example 14 | 4 | 18 | 13.3 | 13 |
| Working Example 15 | 4 | 18 | 13.3 | 13 |
| Working Example 16 | 4 | 18 | 13.3 | 13 |
| Working Example 17 | 4 | 18 | 13.3 | 13 |
| Working Example 18 | 4 | 18 | 13.3 | 13 |
| Working Example 19 | 4 | 18 | 13.3 | 13 |
| Working Example 20 | 4 | 18 | 13.3 | 13 |
| Comparative Example 1 | 4 | 14 | 13.3 | 13 |
| Comparative Example 2 | 4 | 22 | 13.3 | 13 |
| Comparative Example 3 | 4 | 18 | 13.3 | 13 |
| Comparative Example 4 | 4 | 18 | 13.3 | 13 |
| Comparative Example 5 | 4 | 18 | 13.3 | 13 |

|  | Groove surface area ratio $S_{out}$ | Groove surface area Ratio $S_{in}$ | Average groove interval of inclined grooves 64a | Average groove interval of inclined grooves 62a |
| --- | --- | --- | --- | --- |
| Conventional Example | 32 | 41.6 | 36.6 | 30.5 |
| Working Example 1 | 32 | 36.8 | 36.6 | 30.5 |
| Working Example 2 | 32 | 36.8 | 36.6 | 30.5 |
| Working Example 3 | 32 | 36.8 | 36.6 | 30.5 |
| Working Example 4 | 32 | 35.2 | 36.6 | 30.5 |
| Working Example 5 | 32 | 38.4 | 36.6 | 30.5 |
| Working Example 6 | 32 | 36.8 | 36.6 | 30.5 |
| Working Example 7 | 32 | 36.8 | 36.6 | 30.5 |
| Working Example 8 | 32 | 36.8 | 36.6 | 30.5 |
| Working Example 9 | 32 | 36.8 | 36.6 | 30.5 |
| Working Example 10 | 32 | 36.8 | 36.6 | 30.5 |
| Working Example 11 | 32 | 36.8 | 36.6 | 30.5 |
| Working Example 12 | 32 | 36.8 | 36.6 | 30.5 |
| Working Example 13 | 32 | 36.8 | 36.6 | 30.5 |
| Working Example 14 | 32 | 36.8 | 35.1 | 30.5 |
| Working Example 15 | 32 | 36.8 | 38.1 | 30.5 |
| Working Example 16 | 32 | 36.8 | 39.7 | 30.5 |
| Working Example 17 | 32 | 36.8 | 36.6 | 30.5 |
| Working Example 18 | 32 | 36.8 | 36.6 | 30.5 |
| Working Example 19 | 32 | 36.8 | 36.6 | 30.5 |
| Working Example 20 | 32 | 36.8 | 36.6 | 30.5 |
| Comparative Example 1 | 32 | 36.8 | 36.6 | 30.5 |
| Comparative Example 2 | 32 | 36.8 | 36.6 | 30.5 |
| Comparative Example 3 | 32 | 32 | 36.6 | 30.5 |
| Comparative Example 4 | 32 | 40 | 36.6 | 30.5 |
| Comparative Example 5 | 32 | 36.8 | 36.6 | 30.5 |

Steering Stability Test on Dry Road Surface

Each tire is mounted on a rim (18×8.5JJ), a filling air pressure is set to 230 kPa, and the tires are mounted on front and rear wheels of a vehicle (displacement 3,200 cc); the vehicle is made to run a test course formed from a dry asphalt road surface while changing a speed in a range of 0 to 200 km/h, and a sensory evaluation by a skilled driver is performed. The sensory evaluation is a relative evaluation with the conventional example as a standard (index 100). A higher index indicates more superior steering stability.

Steering Stability Test on Wet Road Surface

Each tire is mounted on the rim (18×8.5JJ), the filling air pressure is set to 230 kPa, and the tires are mounted on the front and rear wheels of the vehicle (displacement 3,200 cc); the vehicle is made to run on a handling test road of a test course formed from an asphalt road surface with a water depth of 2 to 3 mm at a speed of 120 km/h, and the sensory evaluation by a skilled driver is performed. The sensory evaluation is the relative evaluation with the conventional example as the standard (index 100). A higher index indicates more superior steering stability.

Uneven Wear Resistance Test

Each tire is mounted on the rim (18×8.5JJ), the filling air pressure is set to 230 kPa, and the tires are mounted on the front and rear wheels of the vehicle (displacement 3,200 cc); after the vehicle is made to run 10,000 km on a circumferential circuit of the test course at a speed of 80 km/h, remaining grooves of regions of tread surfaces on the first side and the second side in the tire width direction that interpose the tire centerline CL of the tire are measured for the tires on the right and left wheels of the front wheels to seek a wear amount after running 10,000 km. A difference between a wear amount on the first side and a wear amount on the second side is evaluated as the uneven wear resistance. The smaller the above difference, the more superior the uneven wear resistance is. Note that the difference between the wear amount on the first side and the wear amount on the second side is sought to two decimal places then rounded to obtain a numerical value of one decimal place.

In the working examples 1 to 3 and the comparative examples 1, 2 illustrated in Table 2 below, the ratio $S_{in}/S_{out}$ is fixed, and the ratio $W_2/W_1$ is changed. The symbol "←" in the fields in Table 2 and the tables after Table 2 indicates that a content of a field is the same as that of the neighbor field to the left.

TABLE 2

|  | Conventional Example | Comparative Example 1 | Comparative Example 2 |
|---|---|---|---|
| Ratio $W_2/W_1$ | 2.5 | 3.5 | 5.5 |
| Ratio $S_{in}/S_{out}$ | 1.3 | 1.15 | ← |
| Presence or absence of chamfer of shoulder land portion | Absence | Presence | ← |
| Ratio $W_4/W_3$ | 0.90 | 0.98 | ← |
| Ratio $D_1/D_2$, ratio $D_4/D_3$ | 0.92 | ← | ← |
| Average groove interval of inclined grooves (inclined grooves 64a of second land portion from first side/inclined grooves 62a of fourth land portion from first side) | 1.1 | 1.2 | ← |
| Dry road surface steering stability | 100 | 97 | 92 |
| Wet road surface steering stability | 100 | 103 | 100 |
| Uneven wear resistance (mm) | 0.9 | 0.3 | 0.3 |

|  | Working Example 1 | Working Example 2 | Working Example 3 |
|---|---|---|---|
| Ratio $W_2/W_1$ | 4.0 | 4.5 | 5.0 |
| Ratio $S_{in}/S_{out}$ | 1.15 | ← | ← |
| Presence or absence of chamfer of shoulder land portion | Presence | ← | ← |
| Ratio $W_4/W_3$ | 0.98 | ← | ← |
| Ratio $D_1/D_2$, ratio $D_4/D_3$ | 0.92 | ← | ← |
| Average groove interval of inclined grooves (inclined grooves 64a of second land portion from first side/inclined grooves 62a of fourth land portion from first side) | 1.2 | ← | ← |
| Dry road surface steering stability | 105 | 108 | 103 |
| Wet road surface steering stability | 100 | 100 | 100 |
| Uneven wear resistance (mm) | 0.3 | 0.3 | 0.3 |

As indicated in Table 2, with the working examples 1 to 3, it is understood that compared to the conventional example, uneven wear resistance is improved, as well as steering stability on the wet road surface is maintained and steering stability on the dry road surface is improved. With the comparative examples 1, 2, steering stability on the dry road surface worsens compared to the conventional example.

In the working examples 2, 4, 5 and the comparative examples 3, 4, the ratio $W_2/W_1$ is fixed, and the ratio $S_{in}/S_{out}$ is changed.

TABLE 3

|  | Comparative Example 3 | Comparative Example 4 | Working Example 4 | Working Example 2 | Working Example 5 |
|---|---|---|---|---|---|
| Ratio $W_2/W_1$ | 4.5 | ← | ← | ← | ← |
| Ratio $S_{in}/S_{out}$ | 1.00 | 1.25 | 1.10 | 1.15 | 1.20 |
| Presence or absence of chamfer of shoulder land portion | Presence | ← | ← | ← | ← |
| Ratio $W_4/W_3$ | 0.98 | ← | ← | ← | ← |
| Ratio $D_1/D_2$, ratio $D_4/D_3$ | 0.92 | ← | ← | ← | ← |
| Average groove interval of inclined grooves (inclined grooves 64a of second land portion from first side/inclined grooves 62a of fourth land portion from first side) | 1.2 | ← | ← | ← | ← |
| Dry road surface steering stability | 98 | 110 | 109 | 108 | 107 |

TABLE 3-continued

|  | Comparative Example 3 | Comparative Example 4 | Working Example 4 | Working Example 2 | Working Example 5 |
|---|---|---|---|---|---|
| Wet road surface steering stability | 100 | 100 | 100 | 100 | 100 |
| Uneven wear resistance (mm) | 0.3 | 1.0 | 0.3 | 0.3 | 0.3 |

As indicated in Table 3, with the working examples 2, 4, 5, it is understood that compared to the conventional example, steering stability on the wet road surface is maintained, steering stability on the dry road surface is improved, and uneven wear resistance is improved. In the comparative example 3, steering stability on the dry road surface worsens compared to the conventional example. Additionally, in the comparative example 4, uneven wear resistance worsens compared to the conventional example. The numerical values to two decimal places of uneven wear resistance (mm) in the comparative example 3, the comparative example 4, the working example 4, the working example 2, and the working example 5 are, in order, 0.25 mm, 1.00 mm, 0.28 mm, 0.30 mm, and 0.34 mm.

It is understood from the results of Tables 2, 3 that when there are chamfers on the shoulder land portions, by setting the ratio $W_2/W_1$ and the ratio $S_{in}/S_{out}$ of the tread patterns 50 to 4 to 5 and 1.1 to 1.2, respectively, either steering stability on the dry road surface or steering stability on the wet road surface can be maintained while at least improving steering stability on the other road surface from among the dry road surface or the wet road surface and uneven wear resistance can be improved. Note that in the comparative example 4, it is thought that a reason why an evaluation of dry road surface steering stability is high at 110 is because among the regions on the first side and the second side in the tire width direction between which the centerline CL is interposed, a load movement works more in the region on the first side while the tire is cornering due to a decrease of a ground contact area on the second side, thereby increasing the ground contact area on the first side and increasing steering stability.

The working example 2 and the comparative example 5 indicated in Table 4 below, differ by a presence or absence of the chamfers 66b, 68c (see FIG. 3) of edges that contact shoulder lug grooves 66a, 68a of the land portions 66, 68 that are the shoulder land portions.

TABLE 4

|  | Working Example 2 | Comparative Example 5 |
|---|---|---|
| Ratio $W_2/W_1$ | 4.5 | ← |
| Ratio $S_{in}/S_{out}$ | 1.15 | ← |
| Presence or absence of chamfers of shoulder land portions | Presence | Absence |
| Ratio $W_4/W_3$ | 0.98 | ← |
| Ratio $D_1/D_2$, ratio $D_4/D_3$ | 0.92 | ← |
| Average groove interval of inclined grooves (inclined grooves 64a of second land portion from first side/inclined grooves 62a of fourth land portion from first side) | 1.2 | ← |
| Dry road surface steering stability | 108 | 106 |
| Wet road surface steering stability | 100 | 100 |
| Uneven wear resistance (mm) | 0.3 | 0.3 |

As indicated in Table 4, the working example 2 that applies the chamfers 66b, 68c has superior steering stability on the dry road surface compared to the comparative example 5 that does not have the chamfers 66b, 68c. Thereby, it is understood that in order to improve steering stability on the dry road surface, it is important to apply the chamfers 66b, 68c on the land portions 66, 68.

In the working examples 6 to 8 in Table 5 below, the ratio $W_4/W_3$ of the groove widths $W_3$, $W_4$ of the third circumferential main groove 52 and the fourth circumferential main groove 56 is changed.

TABLE 5

|  | Working Example 6 | Working Example 2 | Working Example 7 | Working Example 8 |
|---|---|---|---|---|
| Ratio $W_2/W_1$ | 4.5 | ← | ← | ← |
| Ratio $S_{in}/S_{out}$ | 1.15 | ← | ← | ← |
| Presence or absence of chamfers of shoulder land portions | Presence | ← | ← | ← |
| Ratio $W_4/W_3$ | 0.95 | 0.98 | 1.0 | 1.05 |
| Ratio $D_1/D_2$, ratio $D_4/D_3$ | 0.92 | ← | ← | ← |
| Average groove interval of inclined grooves (inclined grooves 64a of second land portion from first side/inclined grooves 62a of fourth land portion from first side) | 1.2 | ← | ← | ← |
| Dry road surface steering stability | 105 | 108 | 105 | 100 |
| Wet road surface steering stability | 100 | 100 | 100 | 103 |
| Uneven wear resistance (mm) | 0.3 | 0.3 | 0.3 | 0.3 |

According to Table 5, the ratio $W_4/W_3$ is preferably 0.95 to 1.0 from a point of view for improving uneven wear resistance, as well as maintaining either steering stability on the dry road surface or steering stability on the wet road surface and at least improving steering stability on the other road surface from among the dry road surface and the wet road surface.

In the working examples 9 to 12 indicated in Table 6 below, the ratio $D_1/D_2$ of the groove depths $D_1$, $D_2$ and the ratio $D_4/D_3$ of the groove depths $D_4$, $D_3$ in the first circumferential main groove 58, the second circumferential main groove 54, the third circumferential main groove 52, and the fourth circumferential main groove 56 respectively are changed. Here, the groove depths $D_2$, $D_3$ are fixed at 8.0 mm, and the groove depths $D_1$, $D_4$ are changed.

TABLE 6

|  | Working Example 9 | Working Example | Working Example 2 | Working Example | Working Example 12 |
|---|---|---|---|---|---|
| Ratio $W_2/W_1$ | 4.5 | ← | ← | ← | ← |
| Ratio $S_{in}/S_{out}$ | 1.15 | ← | ← | ← | ← |
| Presence or absence of chamfers of shoulder land | Presence | ← | ← | ← | ← |
| Ratio $W_4/W_3$ | 0.98 | ← | ← | ← | ← |
| Ratio $D_1/D_2$, ratio $D_4/D_3$ | 0.80 | 0.90 | 0.92 | 0.95 | 1.00 |
| Average groove interval of inclined grooves (inclined grooves 64a of second land portion from first side/ inclined grooves 62a of fourth land portion from first side) | 1.2 | ← | ← | ← | ← |
| Dry road surface steering stability | 115 | 109 | 108 | 105 | 100 |
| Wet road surface steering stability | 100 | 100 | 100 | 100 | 105 |
| Uneven wear resistance (mm) | 0.3 | 0.3 | 0.3 | 0.3 | 0.3 |

According to Table 6, the ratio $D_1/D_2$ and the ratio $D_4/D_3$ are preferably less than 1 from a point of view for improving uneven wear resistance, as well as improving steering stability on the dry road surface and maintaining steering stability on the wet road surface.

Additionally, in the working examples 2, 13 to 16 indicated in Table 7 below, with the average groove intervals of the inclined grooves 64a, 62a, a ratio between the average groove interval of the inclined grooves 64a of the second land portion 64 that is the second from the first side of the tread surface and the average groove interval of the inclined grooves 62a of the fourth land portion 62 that is the fourth from the first side of the tread surface is changed.

TABLE 7

|  | Working Example 13 | Working Example 14 | Working Example 2 | Working Example 15 | Working Example 16 |
|---|---|---|---|---|---|
| Ratio $W_2/W_1$ | 4.5 | ← | ← | ← | ← |
| Ratio $S_{in}/S_{out}$ | 1.15 | ← | ← | ← | ← |
| Presence or absence of chamfers of shoulder land | Presence | ← | ← | ← | ← |
| Ratio $W_4/W_3$ | 0.98 | ← | ← | ← | ← |
| Ratio $D_1/D_2$, ratio $D_4/D_3$ | 0.92 | ← | ← | ← | ← |
| Average groove interval of inclined grooves (inclined grooves 64a of second land portion from first side/ inclined grooves 62a of fourth land portion from first side) | 1.1 | 1.15 | 1.2 | 1.25 | 1.3 |
| Dry road surface steering stability | 104 | 106 | 108 | 110 | 104 |
| Wet road surface steering stability | 100 | 100 | 100 | 100 | 100 |
| Uneven wear resistance (mm) | 0.3 | 0.3 | 0.3 | 0.3 | 0.3 |

According to Table 7, the average groove interval of the inclined grooves 64a/average groove intervals of the inclined grooves 62a is preferably 1.15 to 1.25 from a point of view for improving uneven wear resistance, as well as maintaining either steering stability on the dry road surface or steering stability on the wet road surface and at least improving steering stability on the other road surface from among the dry road surface and the wet road surface.

Additionally, in the working examples 2, 17 to 20 indicated in Table 8 below, the width $W_{chamfer}$ and the depth $D_{chamfer}$ of the chamfers 66b, 68c illustrated in FIG. 3 are changed. In the working examples 17 to 20, dimensions similar to those in the second working example are used, except for the width $W_{chamfer}$ and the depth $D_{chamfer}$ of the chamfers 66b, 68c. The width $W_{chamfer}$ and the depth $D_{chamfer}$ of the chamfers 66b, 68c in the second working example are both 1.5 mm.

TABLE 8

|  | Working Example 2 | Working Example 17 | Working Example 18 | Working Example 19 | Working Example 20 |
|---|---|---|---|---|---|
| Width $W_{chamfer}$(mm) | 1.5 | 2.0 | 0.5 | 0.3 | 2.5 |
| Depth $D_{chamfer}$(mm) | 1.5 | 1.0 | 0.5 | 0.3 | 2.5 |
| Dry road surface steering stability | 108 | 107 | 106 | 103 | 105 |
| Wet road surface steering stability | 100 | 100 | 100 | 100 | 100 |
| Uneven wear resistance (mm) | 0.3 | 0.3 | 0.3 | 0.3 | 0.3 |

According to Table 8, the width $W_{chamfer}$ and the depth $D_{chamfer}$ of the chamfers 66b, 68c are preferably 0.5 mm to 2 mm from a point of view for improving uneven wear resistance, as well as improving steering stability on the dry road surface and maintaining steering stability on the wet road surface.

The pneumatic tire of the present technology was described in detail above. However, it should be understood that the present technology is not limited to the above embodiments, but may be improved or modified in various ways so long as these improvements or modifications remain within the scope of the present technology.

The invention claimed is:

1. A pneumatic tire that mounts on a vehicle so that, when the pneumatic tire is mounted, a first side in a tire width direction corresponds to a vehicle outer side and a second side that is an opposite side of the first side in the tire width direction corresponds to a vehicle inner side, wherein
a region of a tread surface of the pneumatic tire includes:
four circumferential main grooves extending in a tire circumferential direction;
five land portions partitioned by the circumferential main grooves;
first shoulder inclined grooves that are formed in a region of a first side shoulder land portion, from among the land portions, positioned on an outermost side in the tire width direction on the first side and extend in the tire width direction;
second side shoulder inclined grooves that are formed in a region of a second side shoulder land portion positioned on an outermost side in the tire width direction on the second side and extend in the tire width direction; and
chamfers formed on an entire periphery of an edge where the first side shoulder land portion contacts the first shoulder inclined grooves and an entire periphery of an edge where the second side shoulder land portion contacts the second side shoulder inclined grooves;
a ratio $W_2/W_1$ that represents a ratio of a groove width $W_2$ of a second circumferential main groove located at a second position when viewed from the first side to a groove width $W_1$ of a first circumferential main groove located at a first position when viewed from the first side from among the four circumferential main grooves ranges from 4 to 5 when $W_2$ is in a range of 16 to 20 mm; and
a ratio $S_{in}/S_{out}$ that represents a ratio of a groove surface area ratio $S_{in}$ in a region located on the first side when viewed from a tire centerline to a groove surface area ratio $S_{out}$ in a region located on the first side when viewed from the tire centerline in the region of the tread surface ranges from 1.1 to 1.2 when $S_{in}$ is in a range of 35.2 to 38.4%.

2. The pneumatic tire according to claim 1, wherein the first shoulder inclined grooves connect to the first circumferential main groove, and the second shoulder inclined grooves extend from the second side toward the first side and are blocked in a region of the second side shoulder land portion without connecting to a fourth circumferential main groove located at a fourth position when viewed from the first side from among the four circumferential main grooves, and
chamfers are formed on a periphery of an edge where the second side shoulder land portion contracts blocked ends of the second shoulders inclined grooves.

3. The pneumatic tire according to claim 1, wherein the tire centerline passes through between the second circumferential main groove and a third circumferential main groove located at a third position when viewed from the first side from among the four circumferential main grooves,
a continuous land portion extends continuously so as to go completely around in the tire circumferential direction is formed between the second circumferential main groove and the third circumferential main groove, and
center inclined grooves that extends from the third circumferential main groove toward the first side and are blocked midway without reaching the tire centerline are provided in a region of the continuous land portion.

4. The pneumatic tire according to claim 1, wherein both an intermediate land portion formed between the first circumferential main groove and the second circumferential main groove and an intermediate land portion formed between a third circumferential main groove located at a third position when viewed from the first side from among the four circumferential main grooves and a fourth circumferential main groove located at a fourth position when viewed from the first side from among the four circumferential main grooves are continuous land portions that extend continuously so as to go completely around in the tire circumferential direction.

5. The pneumatic tire according to claim 1, wherein chamfer surfaces of the chamfers are flat surfaces or curved surfaces.

6. The pneumatic tire according to claim 1, wherein the chamfers are flat surfaces, and
a depth and a width at which the chamfers are applied is 0.5 to 2 mm.

7. The pneumatic tire according to claim 1, wherein an average groove interval of the first shoulder inclined grooves is longer compared to an average groove interval of the second shoulder inclined grooves.

8. The pneumatic tire according to claim 1, wherein a ratio $W_4/W_3$ that represents a ratio of a groove width $W_4$ of a fourth circumferential main groove located at a fourth position when viewed from the first side to a groove width $W_3$ of a third circumferential main groove located at a third position when viewed from the first side ranges from 0.95 to 1.0.

9. The pneumatic tire according to claim 1, wherein a ratio $D_1/D_2$ that represents a ratio of a groove depth $D_1$ of the first circumferential main groove to a groove depth $D_2$ of the second circumferential main groove from among the four circumferential main grooves and a ratio $D_4/D_3$ that represents a ratio of a groove depth $D_4$ of a fourth circumferential main groove located at a fourth position when viewed from the first side to a ratio $D_3$ of a third circumferential main groove located at a third position when viewed from the first side from among the four circumferential grooves are both less than 1.

10. The pneumatic tire according to claim 1, wherein, in regions of land portions located at a second, a third, and a fourth position when viewed from the first side from among the five land portions, a plurality of inclined grooves that extend in a direction inclined relative to the tire width direction from an edge positioned on the second side and are blocked midway are provided along the tire circumferential direction, and
a second land portion located at the second position is longer compared to a fourth land portion located at the fourth position in regard to average groove intervals thereof.

11. The pneumatic tire according to claim 10, wherein the average groove interval of the inclined grooves provided in the region of the second land portion is 1.15 to 1.25 times the average groove interval of the inclined grooves provided in the region of the fourth land portion.

12. The pneumatic tire according to claim 10, wherein inclined grooves extending in the regions of a third land portion located at the third position and a fourth land portion located at the fourth position have no opening end at edges on the first side thereof.

13. The pneumatic tire according to claim 2, wherein the tire centerline passes through between the second circumferential main groove and a third circumferential main groove located at a third position when viewed from the first side from among the four circumferential main grooves,
a continuous land portion extends continuously so as to go completely around in the tire circumferential direction is formed between the second circumferential main groove and the third circumferential main groove, and
center inclined grooves that extends from the third circumferential main groove toward the first side and are blocked midway without reaching the tire centerline are provided in a region of the continuous land portion.

14. The pneumatic tire according to claim 13, wherein both an intermediate land portion formed between the first circumferential main groove and the second circumferential main groove and an intermediate land portion formed between a third circumferential main groove located at a third position when viewed from the first side from among the four circumferential main grooves and a fourth circumferential main groove located at a fourth position when viewed from the first side from among the four circumferential main grooves are continuous land portions that extend continuously so as to go completely around in the tire circumferential direction.

15. The pneumatic tire according to claim 14, wherein an average groove interval of the first shoulder inclined grooves is longer compared to an average groove interval of the second shoulder inclined grooves.

16. The pneumatic tire according to claim 15, wherein a ratio $W_4/W_3$ that represents a ratio of a groove width $W_4$ of the fourth circumferential main groove located at a fourth position when viewed from the first side to a groove width $W_3$ of a third circumferential main groove located at a third position when viewed from the first side ranges from 0.95 to 1.0.

17. The pneumatic tire according to claim 4, wherein a ratio $D_1/D_2$ that represents a ratio of a groove depth $D_1$ of the first circumferential main groove to a groove depth $D_2$ of the second circumferential main groove from among the four circumferential main grooves and a ratio $D_4/D_3$ that represents a ratio of a groove depth $D_4$ of a fourth circumferential main groove located at a fourth position when viewed from the first side to a ratio $D_3$ of a third circumferential main groove located a at a third position when viewed from the first side from among the four circumferential grooves are both less than 1.

18. The pneumatic tire according to claim 17, wherein, in regions of land portions located at a second, a third, and a fourth position when viewed from the first side from among the five land portions, a plurality of inclined grooves that extend in a direction inclined relative to the tire width direction from an edge positioned on the second side and are blocked midway are provided along the tire circumferential direction, and
a second land portion located at the second position is longer compared to a fourth land portion located at the fourth position in regard to average groove intervals thereof.

19. The pneumatic tire according to claim 1, wherein
a groove width $W_3$ of a third circumferential main groove located at a second position when viewed from the first side is larger than the groove width $W_1$ and smaller than the groove width $W_2$.

20. The pneumatic tire according to claim 1, wherein
a groove width $W_4$ of a fourth circumferential main groove located at a second position when viewed from the first side is larger than the groove width $W_1$ and smaller than the groove width $W_2$.

* * * * *